US012332930B2

(12) United States Patent
Tater et al.

(10) Patent No.: US 12,332,930 B2
(45) Date of Patent: Jun. 17, 2025

(54) MULTI-LINGUAL NATURAL LANGUAGE QUERY

(71) Applicant: International Business Machines Corporation, Armonk, NY (US)

(72) Inventors: Tarun Tater, Mundwa (IN); Jaydeep Sen, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 302 days.

(21) Appl. No.: 17/933,990

(22) Filed: Sep. 21, 2022

(65) Prior Publication Data

US 2024/0095267 A1 Mar. 21, 2024

(51) Int. Cl.
*G06F 40/205* (2020.01)
*G06F 16/3332* (2025.01)
*G06F 40/263* (2020.01)

(52) U.S. Cl.
CPC ........ *G06F 16/3337* (2019.01); *G06F 40/205* (2020.01); *G06F 40/263* (2020.01)

(58) Field of Classification Search
CPC ... G06F 16/3337; G06F 40/205; G06F 40/263
USPC .......................................................... 704/8
See application file for complete search history.

(56) References Cited

U.S. PATENT DOCUMENTS

2005/0038781 A1\* 2/2005 Ferrari .............. G06F 16/24575
2018/0137090 A1\* 5/2018 Duan ....................... G06F 40/30
2022/0019740 A1\* 1/2022 Meyerzon ............. G06F 16/313
2022/0067308 A1\* 3/2022 Mishra ..................... G06F 40/51
2022/0310113 A1\* 9/2022 Tzinis ....................... G06N 3/09

OTHER PUBLICATIONS

X. Han et al., "Bootstrapping Natural Language Querying on Process Automation Data," 2020 IEEE International Conference on Services Computing (SCC), Beijing, China, 2020, pp. 170-177, doi: 10.1109/SCC49832.2020.00030. keywords: {Automation;Runtime;Natural languages;Service computing;Real-time systems (Year: 2020).\*

(Continued)

*Primary Examiner* — Bharatkumar S Shah
(74) *Attorney, Agent, or Firm* — Amin, Turocy & Watson, LLP

(57) ABSTRACT

One or more systems, devices, computer program products and/or computer-implemented methods of use provided herein relate to a process to facilitate multi-lingual query interpretation. A system can comprise a memory that stores computer executable components, and a processor that executes the computer executable components stored in the memory, wherein the computer executable components can comprise an annotation component that generates one or more language invariant signals, an interpretation component that generates a complete query intent using the one or more language invariant signals, and a translation component that processes the complete query intent to an executable backend query to facilitate multi-lingual query interpretation. In one or more embodiments, the translation component can be operatively connected with the interpretation component to generate a zero-shot transfer of the one or more language invariant signals.

20 Claims, 11 Drawing Sheets

(56) References Cited

OTHER PUBLICATIONS

X. Han et al., "Bootstrapping Natural Language Querying on Process Automation Data," 2020 IEEE International Conference on Services Computing (SCC), Beijing, China, 2020, pp. 170-177, doi: 10.1109/SCC49832.2020.00030. keywords: {Automation; Run-time; Natural languages; Service computing; Real-time syst (Year: 2020).*

Jung, et al., "Multilingual Question Answering with High Portability on Relational Databases," MultiSumQA '02: Proceedings of the 2002 Conference on Multilingual Summarization and Question Answering—vol. 19, Aug. 2002 pp. 1-8https://doi.org/10.3115/1118845.1118847.

Dittenbach, et al., "Providing Multilingual Natural Language Access to Tourism Information," https://www.researchgate.net/publication/2390744_Providing_Multilingual_Natural_Language_Access_To_Tourism_Information, Oct. 2001.

Zhang, et al., "The Model Design of a Case-Based Reasoning Multilingual Natural Language Interface for Database," Proceedings. International Conference on Machine Learning and Cybernetics, Nov. 4-5, 2002, 10.1109/ICMLC.2002.1167452.

Valiveti, et al., "Natural Language Interface for Multilingual Database," Information and Communication Technology for Intelligent Systems (ICTIS 2017) Mar. 25-26, 2017,—vol. 2, Smart Innovation, Systems and Technologies 84, DOI 10.1007/978-3-319-63645-0_12.

\* cited by examiner

| Annotator: | Show me top 3 departments in Company ABC by revenue in 2020 | For each department, which Company XYZ employees earned an average salary of more than 80000 in last 3 years |
|---|---|---|
| ModelEntity (Ontology Matches) | ME1: "department": Company.Department<br>ME2: "revenue": FinancialMetric.Revenue | ME1: "department": Company.Department<br>ME2: "Employees":"Employee<br>ME3:"salary": Employment.salary |
| IndexedValueEntity (Data Instance Matches) | Company.name== "ABC" | Company.name== "XYZ" |
| Focus (What is to be returned) | FE1: Company.Department | FE1: Employee |
| Aggregation | NA | AE1.arg:Employment.salary, type:AVG, |
| Comparison | NA | PVE1: arg:AE1, type:">", value:80000 |
| Time Frame | In 2020 : 01/01/2020—31/12/2020 | in last 3 years: 01/01/2019—31/12/2021 |
| Group By | NA | GB1: arg: Company.Department |
| Order By | OBE1.arg: FinancialMetric.Revenue | NA |
| Top K | K=3, arg: OBE1, OBE1.direction=Descending. | NA |

9 which restaurant received the highest rating from Maya in past 6 months ?

```
{
Agg: [['MAX', 'rating']]
Count: []
Comp:
Focus: ['restaurant']
Top K: []
Ord By: []
Grp By: []
}
```

FIG. 5B

9 DUTCH: welk restaurant heeft de afgelopen 6 maanden de hoogste beoordeling gekregen van Maya?

ENGLISH: which restaurant received the highest rating from Maya in past 6 months ?

```
{
Agg: [['MAX', 'beoordeling']]          'hoogste', 'beoordeling'
Count: []                                    highest
Comp:
Focus: ['restaurant']                  'beoordeling'
Top K: []
Ord By: []
Grp By: []
}
```

FIG. 5C

9 GER: Welches Restaurant hat in den letzten 6 Monaten die höchste Bewertung von Maya erhalten?

ENGLISH: which restaurant received the highest rating from Maya in past 6 months ?

```
{
Agg: [['MAX', 'Bewertung']]            'hochste', 'Bewertung'
Count: []                                    highest
Comp:
Focus: ['Restaurant']                  'Bewertung'
Top K: []
Ord By: []
Grp By: []
}
```

FIG. 5D

9 FRENCH: quel restaurant a reçu la meilleure note de Maya au cours des 6 derniers mois?

ENGLISH: which restaurant received the highest rating from Maya in past 6 months ?

```
{
Agg: [['MAX', 'note']]                 'meilleure', 'note'
Count: []                                    highest
Comp:
Focus: ['restaurant']                  'note'
Top K: []
Ord By: []
Grp By: []
}
```

12 what is the average rating given by reviewers with age above 30, in this year
{
Agg: [['AVG', 'rating']]
Count: []
Comp: [['age', '>', '30']]
Focus: []
Top K: []
Ord By: []
Grp By: ['reviewers']
}

FIG. 6A

12 DUTCH: wat is de gemiddelde beoordeling van recensenten met een leeftijd boven de 30 in dit jaar ENGLISH: what is the average rating given by reviewers with age above 30, in this year {
Agg: [['AVG', 'beoordeling']]
Count: []
Comp: [['leeftijd', '>', '30']] → "leeftijd boven de 30"  "age over 30"
Focus: []
Top K: []
Ord By: []
Grp By: ['recensenten'] → 'reviewers'
}

FIG. 6B

12 FRENCH: quelle est la note moyenne donnée par les évaluateurs âgés de plus de 30 ans, cette année ENGLISH: what is the average rating given by reviewers with age above 30, in this year {
Agg: [['AVG', 'note']]
Count: []
Comp: [['âgés', '>', '30']] → "âges de plus de 30"  "age over 30"
Focus: []
Top K: []
Ord By: []
Grp By: ['évaluateurs'] → 'reviewers'
}

FIG. 6C

12 GER: Wie lautet die durchschnittliche Bewertung von Rezensenten über 30 Jahren in diesem Jahr ENGLISH: what is the average rating given by reviewers with age above 30, in this year {
Agg: [['AVG', 'Bewertung']]
Count: []
Comp: [['Jahren', '>', '30']] → "über 30 jahren"  "over 30 years old"
Focus: []
Top K: []
Ord By: []
Grp By: ['Rezensenten'] → 'reviewers'
}

FIG. 6D

MULTI-LINGUAL NATURAL LANGUAGE QUERY

BACKGROUND

One or more embodiments described herein relate generally to multi-lingual natural language queries (NLQ) and natural language interfaces to databases (NLIDB). Embodiments relate to integrating multi-lingual NLQ with a NLIDB system, and more specifically, multi-lingual query interpretation based on language invariant signals for identifying query intent.

SUMMARY

The following presents a summary to provide a basic understanding of one or more embodiments described herein. This summary is not intended to identify key or critical elements, or delineate any scope of the particular embodiments or any scope of the claims. The sole purpose of the summary is to present concepts in a simplified form as a prelude to the more detailed description that is presented later. In one or more embodiments described herein, systems, devices, computer-implemented methods, and/or computer program products that facilitate error mitigation for quantum computing are described.

According to an embodiment, a system can comprise a memory that stores computer executable components and a processor that executes the computer executable components stored in the memory. The computer executable components can include an annotation component that can generate one or more language invariant signals; an interpretation component that can generate a complete query intent using the one or more language invariant signals; and a translation component that can process the complete query intent to an executable backend query to facilitate multi-lingual query interpretation. Further, the translation component can be operatively connected with the interpretation component to generate a zero-shot transfer of the one or more language invariant signals. The annotation component can search the one or more language invariant signals for one or more trigger words to confirm a predicted query intent.

Additionally, the annotation component can predict a query intent of the one or more language invariant signals independent of domain and language specific training. The annotation component can utilize part-of-speech (POS) tagging in predicting the query intent of the one or more language invariant signals. Further, the annotation component can employ a dependency parse tree in predicting the query intent of the one or more language invariant signals.

According to another embodiment, a computer-implemented method of multi-lingual query interpretation can comprise generating, using a processor operatively coupled to memory, one or more language invariant signals; generating, using the processor, a complete query intent to an executable backend query to facilitate multi-lingual query interpretation. The computer-implemented method can comprise searching, using the processor, the one or more language invariant signals for one or more trigger words to confirm a predicted query intent; and predicting, using the processor, a query intent of the one or more language invariant signals independent of domain specific training.

Additionally, the computer-implemented method can comprise tagging, using the processor, in predicting the query intent of the one or more language invariant signals. The computer-implemented method can comprise employing, using the processor, a dependency parse tree in predicting the query intent of the one or more language invariant signals.

According to yet another embodiment, a computer program product for multi-lingual query interpretation, the computer program product can comprise a computer readable storage medium having program instructions embodied therewith, the program instructions executable by a processor can cause the processor to generate, using the processor operatively coupled to memory, one or more language invariant signals; generate, using the processor, a complete query intent using the one or more language invariant signals; and process, using the processor, the complete query intent to an executable backend query to facilitate multi-lingual query interpretation. The computer program product can cause the process or to generate, using the processor, a zero-shot transfer of the one or more language invariant signals.

Additionally, the computer program product can cause the processor to search, using the processor, the one or more language invariant signals for one or more trigger words to confirm a predicted query intent. The computer program product can cause the processor to predict the query intent of the one or more language invariant signals independent of domain and language specific training. Further, in embodiments, the computer program product can cause the processor to part-of-speech (POS) tag, using the processor, in predicting the query intent of the one or more language invariant signals. The computer program product can cause the processor to employ, using the processor, a dependency parse tree in predicting the query intent of the one or more language invariant signals.

DESCRIPTION OF THE DRAWINGS

FIG. 4 illustrates a table of example, non-limiting nomenclature that can be used to name entities of the query, in accordance with one or more embodiments described herein.

FIG. 5A illustrates a portion of an example, non-limiting algorithm that can be used to interpret the received query, in accordance with one or more embodiments described herein.

FIG. 5B illustrates a portion of an example, non-limiting algorithm that can be used to interpret the received Dutch query, in accordance with one or more embodiments described herein.

FIG. 5C illustrates a portion of an example, non-limiting algorithm that can be used to interpret the received German query, in accordance with one or more embodiments described herein.

FIG. 5D illustrates a portion of an example, non-limiting algorithm that can be used to interpret the received French query, in accordance with one or more embodiments described herein.

FIG. 6A illustrates a portion of an example, non-limiting algorithm that can be used to interpret the received query, in accordance with one or more embodiments described herein.

FIG. 6B illustrates a portion of an example, non-limiting algorithm that can be used to interpret the received Dutch query, in accordance with one or more embodiments described herein.

FIG. 6C illustrates a portion of an example, non-limiting algorithm that can be used to interpret the received French query, in accordance with one or more embodiments described herein.

FIG. 6D illustrates a portion of an example, non-limiting algorithm that can be used to interpret the received German query, in accordance with one or more embodiments described herein.

DETAILED DESCRIPTION

Figure 1:
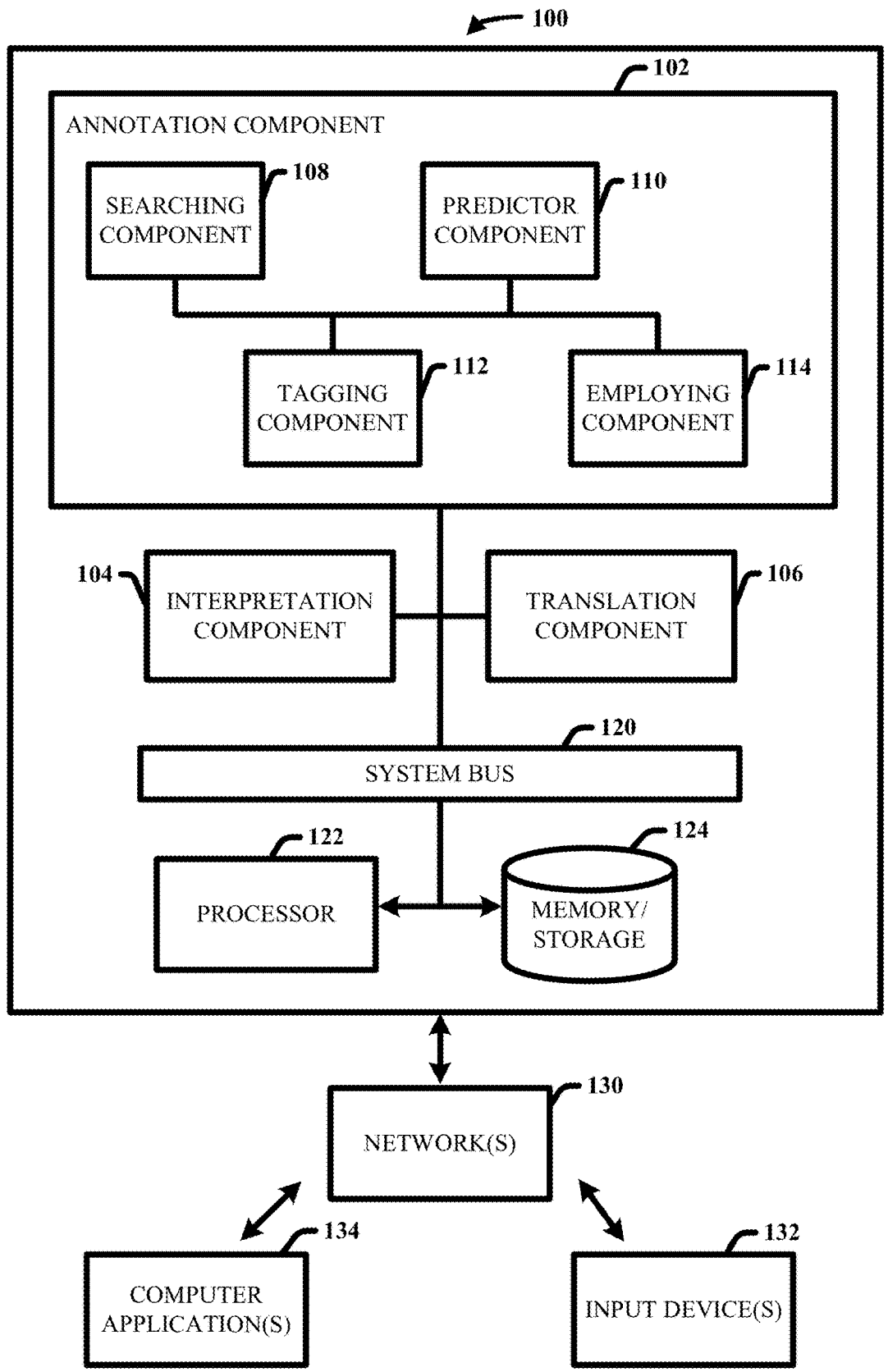
FIG. 1 illustrates a block diagram of an example, non-limiting system that can facilitate multi-lingual query interpretation based on language invariant signals, in accordance with one or more embodiments described herein.

The following detailed description is merely illustrative and is not intended to limit embodiments or application or uses of embodiments. Furthermore, there is no intention to be bound by any expressed or implied information presented in the preceding Background or Summary sections, or in this Detailed Description section.

In some cases, NLIDB systems can provide inaccurate answers to natural language questions. There can be various reasons for the inaccurate answers. One reason for an inaccurate answer can be that the NLIDB systems performs a partial and/or inaccurate interpretation. A partial interpretation can occur when the NLIDB system fails to interpret one or more parts of the question accurately (e.g., the NLQ can be in a differing language than the NLIDB). For example, a German natural language query can include the German phrase, "Finden Sie alle Rezensenten, die alter als 20 Jahre sind und eine durchschnittiche Bewertung von mehr als 3 haben." The equivalent English translated NLQ can be "Find all reviewers who are older than 20 years and have an average rating of more than 3." With some NLIDB systems, the system may not be capable of processing a NLQ in a differing language than the native language of the NLIDB. For example, the NLIDB system can fail to identify the German word, "durchschnittiche" as the English word "average," and, as a result, further fail to output the correct data/information in response to the natural language query. A limitation of current NLIDB systems is that NLIDB systems are not configured to process natural language queries accurately if received in a different language than the native language of the NLIDB system. For such systems to handle natural langue queries in various languages, the NLIDB system typically includes domain-specific and language-specific training.

Currently NLIDB systems are not configured to induce multi-lingual understanding such as to handle multi-lingual question answering. Moreover, current multi-lingual language models (e.g., such as mBART) are typically used in machine reading comprehension (MRC). Multi-lingual language models are not directly applicable to the two-step process of NLIDB systems: i) understanding the intent of the natural language query; and ii) converting the intent to an executable query.

Given these problems, one or more embodiments described herein can be implemented to produce a solution to one or more of these problems in the form of systems, computer-implemented methods, and/or computer program products that can facilitate the following processes: i) generating, using a processor, one or more language invariant signals; ii) generating, using the processor, a complete query intent using the one or more language invariant signals; and iii) processing, using the processor, the complete query intent to an executable backend query to facilitate multi-lingual query interpretation. That is, embodiments described herein include one or more systems, computer implemented methods, apparatuses and/or computer program products that can facilitate one or more of the aforementioned processes.

FIG. 1 illustrates a block diagram of an example, non-limiting system 100 that comprises an annotation component 102, an interpretation component 104, and a translation component 106. Additionally, the annotation component 102 can generate/capture one or more language invariant signals, the interpretation component 104 can generate a complete query intent using the one or more language invariant signals, and the translation component 106 can process the complete query intent to an executable backend query to facilitate multi-lingual query interpretation. Repetitive description of like elements employed in other embodiments described herein is omitted for sake of brevity. Aspects of systems (e.g., the multi-lingual natural language query system 100 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines (e.g., computers, computing devices, virtual machines, a combination thereof, and/or the like) can cause the machines to perform the operations described.

Figure 10:
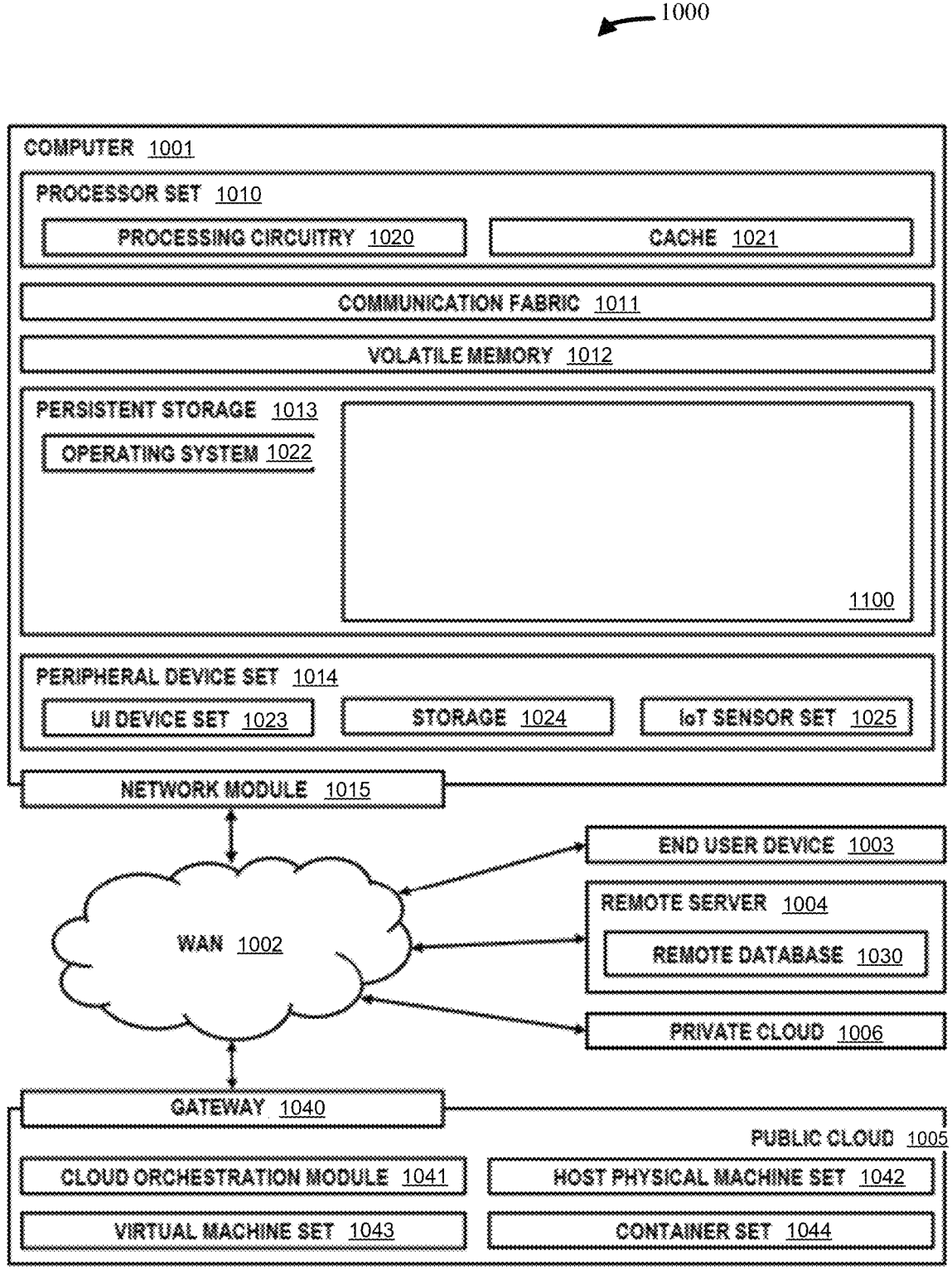
FIG. 10 illustrates a block diagram of an example, non-limiting operating environment in which one or more embodiments described herein can be facilitated.

Additional description of functionalities will be further described below with reference to the example embodiments of FIGS. 1 and 2, where repetitive description of like elements and/or processes employed in respective embodiments is omitted for sake of brevity. The multi-lingual natural language query system 100 can facilitate: i) generating one or more language invariant signals; ii) generating a complete query intent using the one or more language invariant signals; and iii) processing the complete query intent to an executable backend query to facilitate multi-lingual query interpretation. The interpretation component 104 can be operatively linked with the translation component 106 such as to generate a zero-shot transfer of the one or more language invariant signals. The annotation component 102 can include a searching component 108, a predictor component 110, a tagging component 112, and an employing component 114. The annotation component 102, the interpretation component 104, the translation component 106, the searching component 108, the predictor component 110, the tagging component 112, and the employing component 114 can be associated with a computing environment 1000 (FIG. 10).

In embodiments, FIG. 1 illustrates a block diagram of an example, non-limiting multi-lingual natural language query system 100 that can address the challenges of multi-lingual query interpretation (e.g., domain-specific and language-specific training dependency) in accordance with one or more embodiments described herein. The annotation component 102 can receive a natural language query from a user/input source and can facilitate understanding/processing of the natural language query independent of the query's language and domain. In embodiments, an example NLQ can be "Show me top 3 departments in Company ABC by revenue in 2020" received in one or more of a variety of languages (e.g., German, French, English, etc.) For example and without limitation, in the case of a German NLQ being received by the annotation component 102, the system 100 can process the German NLQ and can accurately search/utilize an English-based language processor 202, an English-based ontology service 204, and an English based translation index 206 (e.g., see also FIG. 2). Similarly, the annotation component 102 can receive an English NLQ and can accurately search/utilize a French-based language processor 202, a French-based ontology service 204, and a French-based translation index 206 (e.g., see also FIG. 2).

Further, in understanding an intent of the natural language query, the annotation component 102 can employ/utilize the searching component 108, the predictor component 110, the tagging component, 112, and the employing component 114. The annotation component 102 can generate one or more language invariant signals through the use of associated components 108-114 such that the language invariant signals can be processed and analyzed with substantial accuracy regardless of the NLQ language. The system 100 can use the one or more language invariant signals for analysis without considering domain specific and language specific training (e.g., since the language dependency can be removed from the signal by generating a langue invariant signal via operations of the annotation component 102).

In examples, the annotation component 102 can predict (e.g., via the processor 122 and the predictor component 110) a query intent of the one or more language invariant signals independent of domain and language specific training. In predicting the query intent, the annotation component 102 can part-of-speech (POS) tag (e.g., via the processor 122 and the tagging component 112) the received natural language query. Additionally, the annotation component 102 can employ (e.g., via the processor 122 and the employing component) a dependency parse tree in predicting the query intent of the one or more language invariant signals. The annotation component 102 can use sentence structure and part-of-speech tagging to predict the query intent of a variety of different language natural language queries. Utilizing sentence structure and POS tagging can eliminate errors likely to result if directly translating the received natural language query prior to interpretation/analysis. The multi-lingual natural language query system 100 can analyze the natural langue query structure and speech (e.g., via the annotation component 102) prior to grounding the natural language query to English for execution on a backend query. Further, the annotation component 102 can search (e.g., via the processor 122 and the searching component 108) the one or more language invariant signals for one or more trigger words to confirm the predicted query intent (to be converted into an executable query by the interpretation component 104 and the translation component 106).

Figure 2:
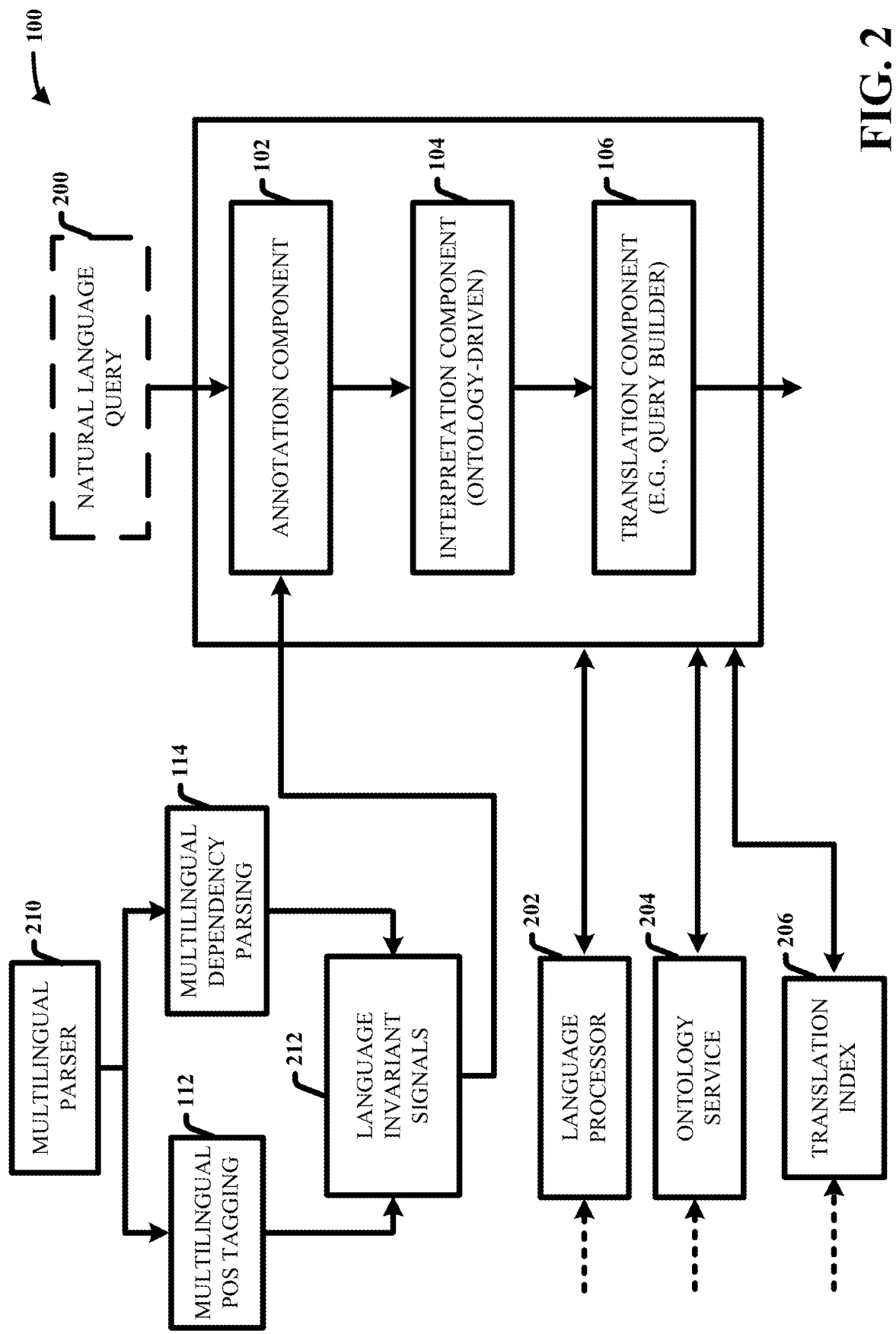
FIG. 2 illustrates a block diagram of an example, non-limiting system that can facilitate multi-lingual query interpretation based on language invariant signals, in accordance with one or more embodiments described herein.

Turning next to FIG. 2, an example, non-limiting multi-lingual natural language query system 100 is illustrated in further detail and can receive a natural language query 200. The multi-lingual natural language query system 100 can be connected with a language processor 202, an ontology service 204, and a translation index 206. The language processor 202, the ontology service 204, and the translation index 206 can be connected to one or more of a variety of NILDB systems and/or networks. In embodiments, the multi-lingual natural language query system 100 can receive the natural language query and transmit/exchange the information with the language processor 202, the ontology service 204, and the translation index 206.

With embodiments, the annotation component 102 can further include a multilingual parser 210 for analysis/interpretation of the natural language query 200. The tagging component 112 and the employing component 114 can facilitate multilingual POS tagging and multilingual dependency parsing, respectively to generate one or more language invariant signals 212. The language invariant signals 212 can further be used by the interpretation component 104 and the translation component 106 for multi-lingual natural langue query interpretation of the natural language query 200. Further, in accordance with FIG. 2, the interpretation component 104 of the multi-lingual natural language query system 100 can be ontology-driven and the translation component can function as a query builder.

In embodiments, such as generally illustrated in FIG. 2, the annotation component 102 can receive the natural language query 200, generate one or more language invariant signals 212, and transmit the one or more language invariant signals 212 to the interpretation component 104 and the translation component 106 for further interpretation and execution. For example, backend data (e.g., data that may be contained and transmitted via the language processor 202, the ontology service 204, and the translation index 206) does not change with respect to use of the multi-lingual natural language query system 100, which can be stored in one or more of a variety of databases operatively connected with the system 100. In embodiments, if the natural language query 200 includes a different language than the searched database, the database can still be accurately queried.

Figure 3:
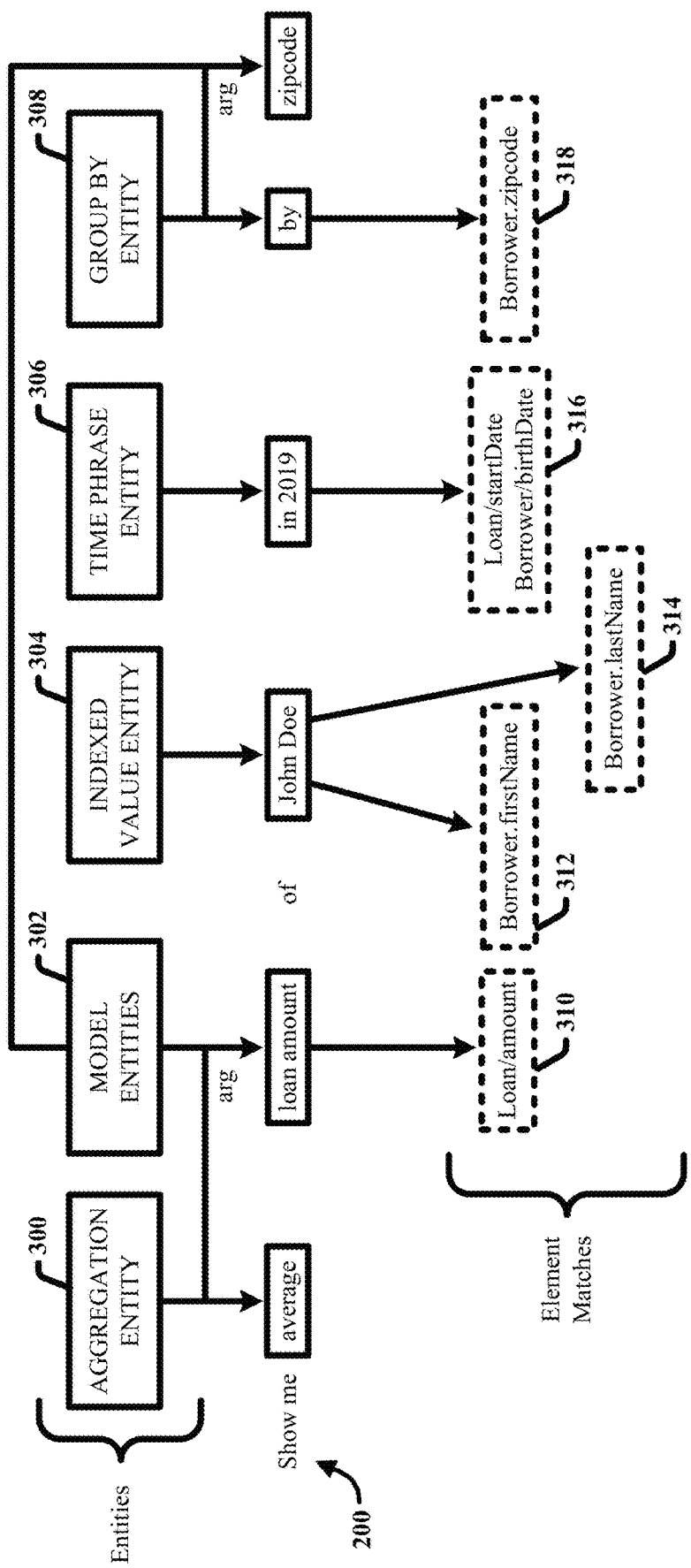
FIG. 3 illustrates a diagram of an example, non-limiting system that can facilitate multi-lingual query interpretation in response to receiving a query, in accordance with one or more embodiments described herein.

Turning now to FIG. 3, the natural language query 200 can be analyzed/processed (e.g., can be semantically annotated) by the annotation component 102. The annotation component 102 can generate one or more language invariant signals 212. Further, the annotation component 102 can semantically annotate the natural language query 200, as represented by entities 300-308 assigned to one or more words of the natural language query 200, to generate the one or more language invariant signals 212. For example and without limitation, entities can include an aggregation entity 300, a model entity 302, an indexed value entity 304, a time phrase entity 306, and a group by entity 308. Semantic annotation of the natural language query 200 can facilitate accurate interpretation of one or more different languages of queries executed on the same intelligent database. The annotation component 102 can search (e.g., via the searching component 108) for trigger words to confirm a predicted intent (e.g., via the predictor component 110) of the natural language query 200. The annotated entities 300-308 can be combined deterministically to build a valid target language query as the output of the annotation component 102. The annotation component 102 can utilize POS tagging (e.g., via the processor 122 and the tagging component 112) and can employ a dependency parse tree (e.g., via the processor 122 and the employing component 114) in predicting the query intent of the language invariant signal 212 (such as illustrated in FIG. 3).

Further, the various entities 300-308 can correlate to various database element matches 310-318. For example and without limitation, as shown in FIG. 3, "loan amount" can correlate to a "Loan/amount" element 310; "John" can correlate to a "Borrower.firstName" element 312; "Doe" can correlate to a "Borrower.lastName" element 314; "in 2019" can correlate to a "Loan/startDate" element and a "Borrower/birthdate" element 316; and "by zipcode" can correlate to a "Borrower.zipcode" element 318. The one or more entities 300-308 can signify a particular type of operation.

Further, FIG. 4 illustrates a table representing various entity naming nomenclature and the results of two corresponding natural language queries (e.g., "Show me top 3 departments in Company XYZ by revenue in 2020" and "For each department, which Company ABC employees earned an average salary of more than 80000 in last 3 years"). Example entities can be "ModelEntity", "IndexedValueEntity", "Focus", "Aggregation", "Comparison", "Time Frame", "Group By", "Order By", and "Top K". For example and without limitation, in embodiments, aggregation entity can correspond to an aggregation operation in the target query; and model entity can correspond to a match of the ontology element. Further, indexed value and time frame can correspond to where clauses of the natural language query 200. Group By can correspond to a group by clause in sequel query.

In example embodiments, the multi-lingual natural language query system 100 can include a form of user input to populate the ontology of the system 100. A user can input one or more of a variety of multi-lingual synonyms to make the ontology richer and more accurate. The richer the multi-lingual natural language query system 100, the better (e.g., more accurate) the system 100 will perform in response to queries of differing languages and types.

For example and without limitation, FIGS. 5A, 5B, 5C, and 5D illustrate the multi-lingual natural language query system 100 (e.g., the annotation component 102) searching for amod (e.g., adjective modifier) dependency to an adjective POS tag which should match to a numeric property. FIG. 5A illustrates the analysis of an English natural language query. FIG. 5B illustrates the analysis of a Dutch natural language query. FIG. 5C illustrates the analysis of a German natural language query. FIG. 5D illustrates the analysis of a French natural language query. The various natural language queries in FIGS. 5A-5D can be mapped to the Aggregation entity and to the Focus entity via POS tagging and employing dependency parse trees.

Additionally, FIGS. 6A, 6B, 6C, 6D illustrate the multi-lingual natural language query system 100 (e.g., the annotation component 102) searching for a number POS tag and checking for the nearest graph traversal to the adjective entity and numeric properties. FIG. 6A illustrates the analysis of an English natural language query. FIG. 6B illustrates the analysis of a Dutch natural language query. FIG. 6C illustrates the analysis of a French natural language query. FIG. 6D illustrates the analysis of a German natural language query. The various natural language queries in FIGS. 6A-6D can be mapped to the Aggregation entity, the Comparison entity, the Focus entity, and the Group By entity via POS tagging and employing dependency parse trees.

Figure 7:
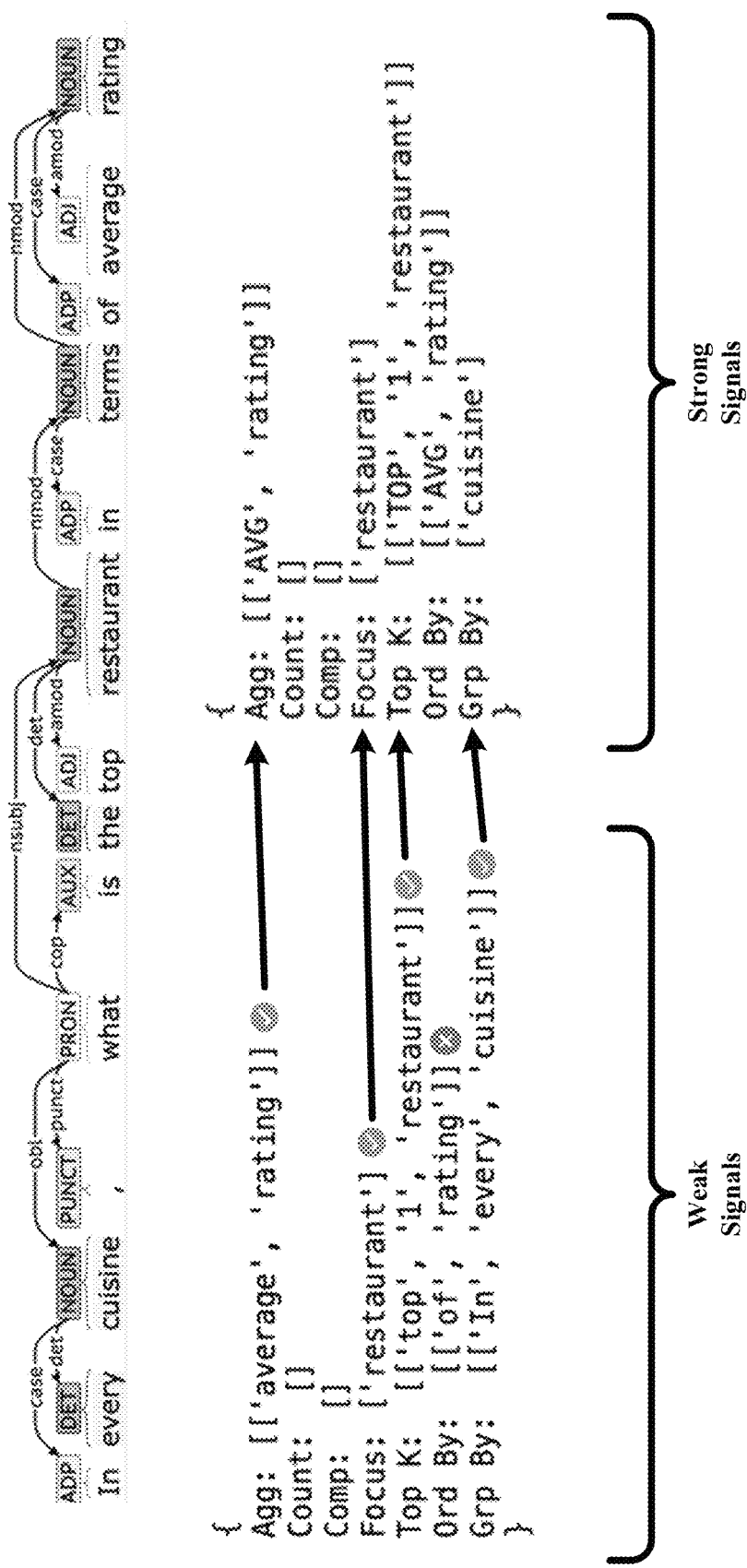
FIG. 7 illustrates an example, non-limiting query and portions of algorithms that can be used to interpret the received query, in accordance with one or more embodiments described herein.

In embodiments, such as illustrated by FIG. 7, the multi-lingual natural language query system 100 and the annotation component 102 can utilize POS tagging in predicting the query intent of the one or more language invariant signals. Further, the annotation component 102 can employ a dependency parse tree to further predict the query intent of the one or more language invariant signals. The annotation component 102 can identify one or more various parts of speech (e.g., adjectives, nouns, verbs, etc.). As indicated by FIG. 7, the weak signal algorithm can be the result of the first stage of the multi-lingual natural language query system 100 in which the query intent of the input signal can be guessed by detecting entities and the specific query structure. The second stage of the multi-lingual natural language query system 100 is indicated by the strong signal algorithm in which the guessed query intent can be confirmed by using a translator to ground the language invariant signal back to English for interpretation/processing/querying. The annotation component 102 can use a focused translation to ground the query to English. Moreover, the specific portions from the query that produced entity tags in the first stage of the system 100 can be translated to English to create the language invariant signals. For example, the language "rating" and "of" can be processed by the annotation component 102 as a weak signal, where "of" is not actually an Order By trigger word. Turning to the second stage of the multi-lingual natural language query system 100, the annotation component 102 can utilize second order reasoning to determine that the Top K entity should relate to an Order by entity as shown in FIG. 7.

Figure 8:
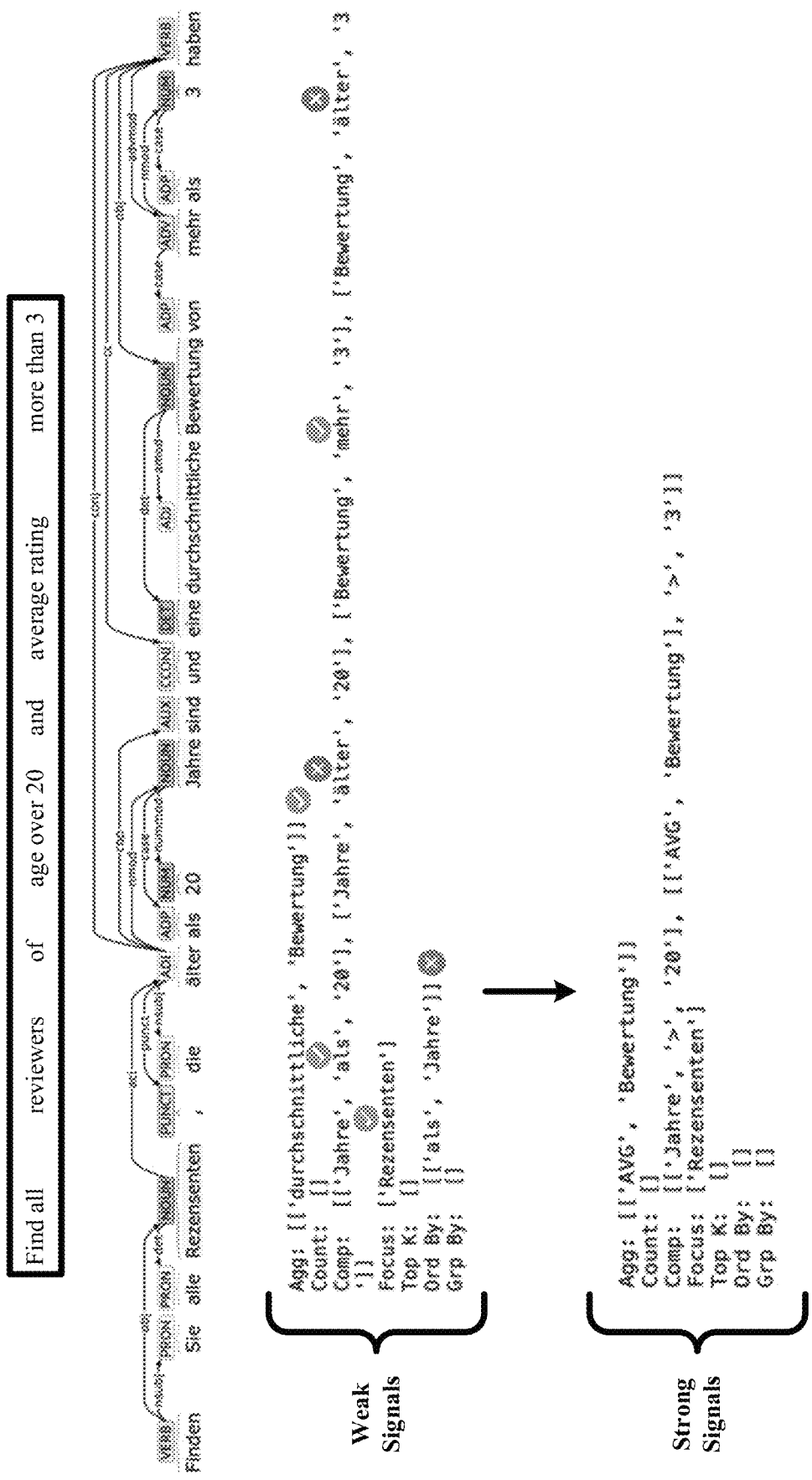
FIG. 8 illustrates an example, non-limiting query and portions of algorithms that can be used to interpret the received query, in accordance with one or more embodiments described herein.

Additionally, as illustrated in FIG. 8, the multi-lingual natural language query system 100 can analyze a German natural language query including two comparison operators in two stages (e.g., guessing the intent of the receiving signal and confirming the guessed intent). The annotation component 102 can process the weak signals from natural language query in the first stage and can also utilize focused translations in processing the weak signals to strong signals to create one or more language invariant signals.

With embodiments, a computer-implemented method 900 of multi-lingual query interpretation can comprise a first step of semantic annotation (step 902) in which a natural language query can be received by the processor 122, and the processor 122 can combine the annotated entities in the second step to build a valid target language query (step 904). Semantic annotation (step 902) can include generating, using a processor 122 operatively coupled to memory, one or more language invariant signals. Further, semantic annotation (step 902) can include utilizing POS tagging in predicting a query intent of the language invariant signal (step 912) and employing a dependency parse tree in predicting the query intent (914). The computer-implemented method 900 can include checking for user ontology input (step 916); which, if detected, can be implemented by comparing the natural language query with the user ontology (step 918). Additionally, the computer-implemented method 900 can include searching, via the processor 12, the language invariant signal for one or more trigger words to confirm the predicted intent (step 920).

Figure 9A:
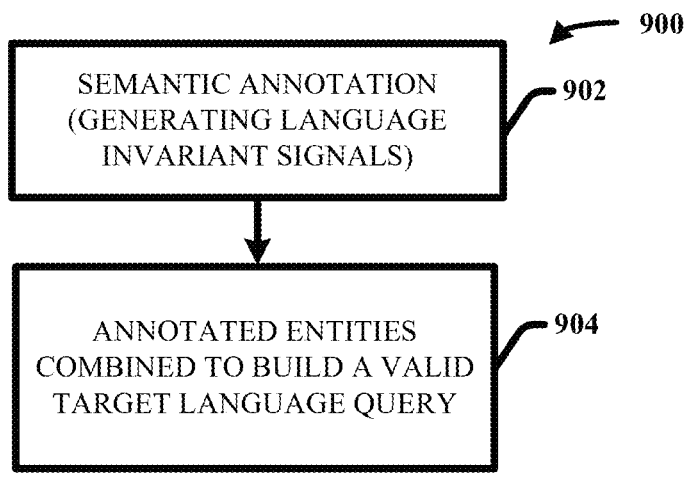
FIGS. 9A, 9B, and 9C illustrate flow diagrams of an example, non-limiting computer implemented method that can facilitate multi-lingual query interpretation based on language invariant signals, in accordance with one or more embodiments described herein.
Figure 9B:
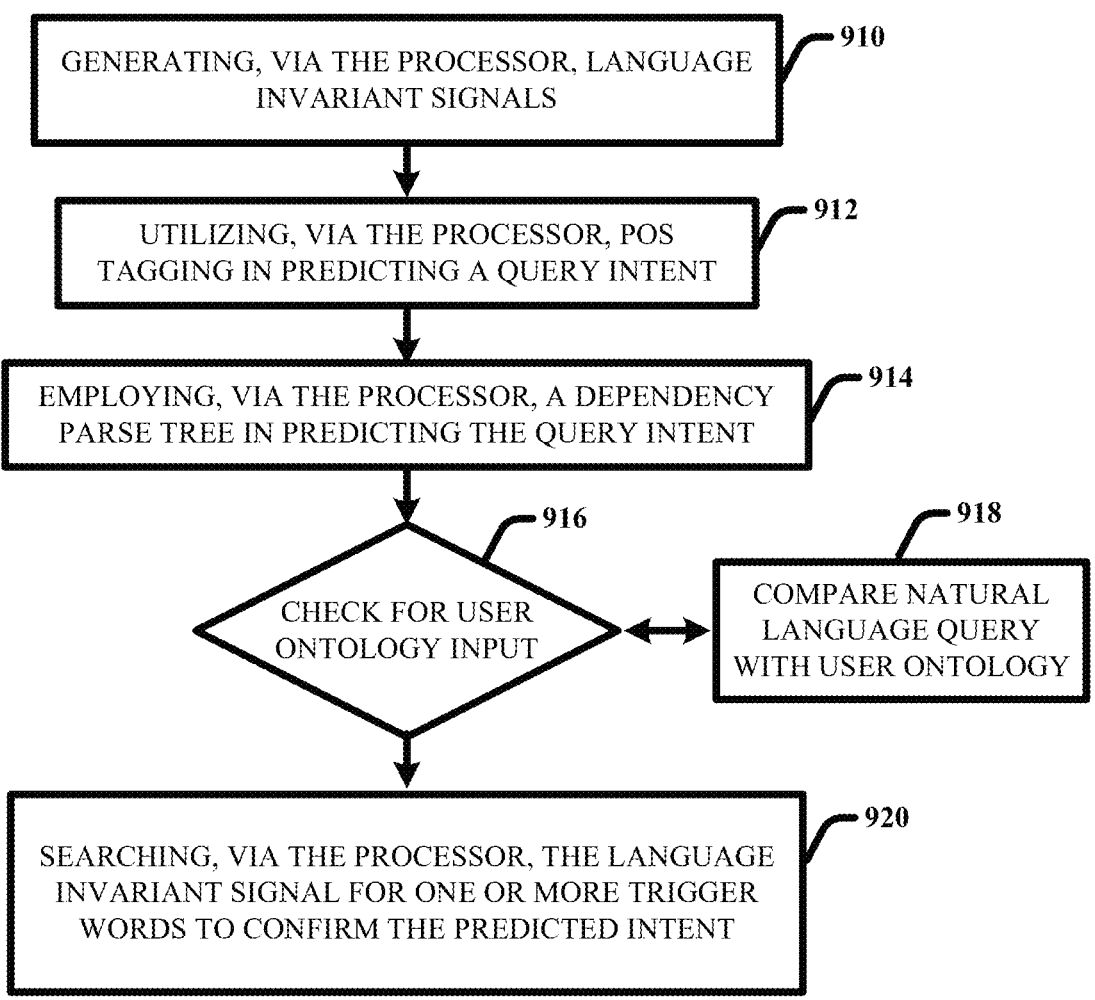
Figure 9C:
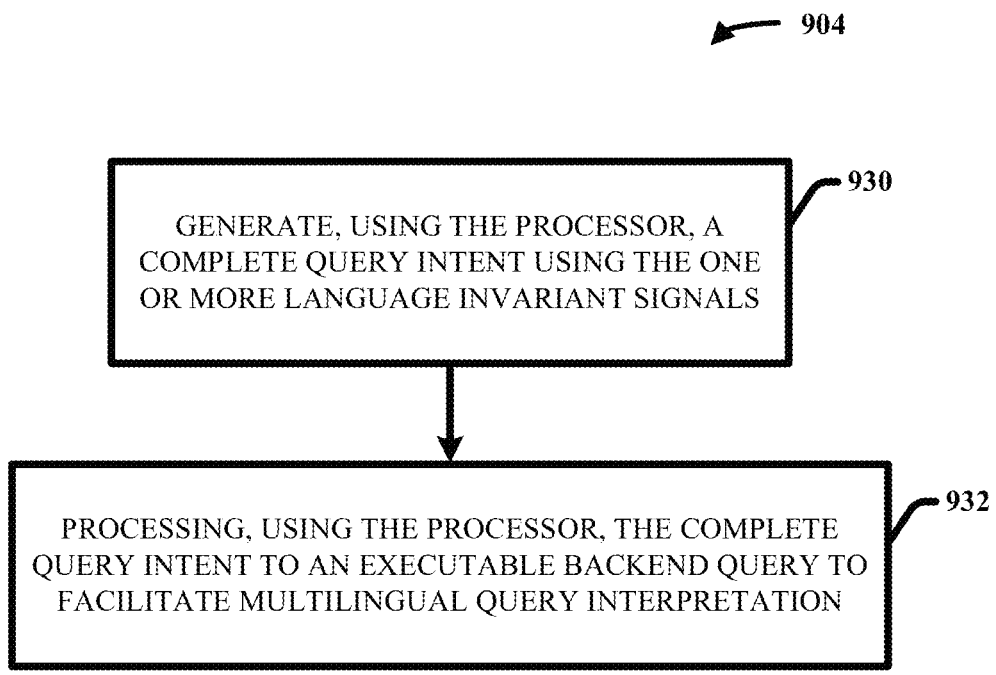

In embodiments, such as shown by FIG. 9C, the computer-implemented method 904 of building a valid target language query can comprise generating, using the processor 122, a complete query intent using the language invariant signals (step 930), and processing, using the processor 122, the complete query intent to an executable backend query to facilitate multilingual query interpretation (step 932).

For example, one or more embodiments described herein of the multi-lingual natural language query system 100 and/or one or more components thereof can employ one or more computing resources of the computing environment 1000 described below with reference to the illustration 1000 of FIG. 10. For instance, the system and/or components thereof can employ one or more classical and/or quantum computing resources to execute one or more classical and/or quantum: mathematical functions, calculations and/or equations; computing and/or processing scripts; algorithms; models (e.g., artificial intelligence (AI) models, machine learning (ML) models and/or like model); and/or another operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth and active user accounts). Resource usage can be monitored, controlled and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

A cloud computing environment is service oriented with a focus on statelessness, low coupling, modularity and/or semantic interoperability. At the heart of cloud computing is an infrastructure that includes a network of interconnected nodes.

Moreover, the multi-lingual natural language query system 100 can be associated with or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system or the like. In accordance therewith, the multi-lingual natural language query system 100 can be employed to use hardware and/or software to solve problems that are highly technical in nature, that are not abstract and/or that cannot be performed as a set of mental acts by a human.

It should be appreciated that the embodiments depicted in various figures disclosed herein are for illustration only, and as such, the architecture of embodiments is not limited to the systems, devices and/or components depicted therein, nor to any particular order, connection and/or coupling of systems, devices and/or components depicted therein. For example, in some embodiments, the multi-lingual natural language query system 100 can further comprise various computer and/or computing-based elements described herein with reference to computing environment 1000 and FIG. 10. In several embodiments, computer and/or computing-based elements can be used in connection with implementing one or more of the systems, devices, components and/or computer-implemented operations shown and described in connection with FIG. 1 or with other figures disclosed herein.

Memory 124 can store one or more computer and/or machine readable, writable and/or executable components and/or instructions that, when executed by processor 122 (e.g., a classical processor, a quantum processor and/or like processor), can facilitate performance of operations defined by the executable component(s) and/or instruction(s). For example, memory 124 can store computer and/or machine readable, writable and/or executable components and/or instructions that, when executed by processor 122, can facilitate execution of the various functions described herein relating to the annotation component 102, the interpretation component 104, the translation component 106, and/or another component associated with the multi-lingual natural language query system 100 as described herein with or without reference to the various figures of the one or more embodiments.

Memory 124 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures. Further examples of memory 124 are described below with reference to system volatile memory 1012 and FIG. 10. These examples of memory 124 can be employed to implement any one or more embodiments described herein.

Processor 122 can comprise one or more types of processors and/or electronic circuitry (e.g., a classical processor, a quantum processor and/or like processor) that can implement one or more computer and/or machine readable, writable and/or executable components and/or instructions that can be stored at memory 124. For example, processor 122 can perform various operations that can be specified by computer and/or machine readable, writable and/or executable components and/or instructions including, but not limited to, logic, control, input/output (I/O), arithmetic and/or the like. In some embodiments, processor 122 can comprise one or more central processing units, multi-core processors, microprocessors, dual microprocessors, microcontrollers, System on a Chip (SOCs), array processors, vector processors, quantum processors and/or another type of processor. Additional examples of processor 122 are described below with reference to processor set 1010 and FIG. 10. The examples of processor 122 can be employed to implement any one or more embodiments described herein.

The multi-lingual natural language query system 100, the annotation component 102, the interpretation component 104, the translation component 106, the searching component 108, the predictor component 110, the tagging component 112, the employing component, the processor 122, the memory 124, and/or another component of system 100 as described herein can be communicatively, electrically, operatively and/or optically coupled to one another via system bus 120 to perform functions of system 100 and/or any components coupled therewith. System bus 120 can comprise one or more memory buses, memory controllers, peripheral buses, external buses, local buses, a quantum buses and/or another type of bus that can employ various bus architectures. The examples of system bus 120 can be employed to implement any one or more embodiments described herein.

The multi-lingual natural language query system 100 can comprise any type of component, machine, device, facility, apparatus and/or instrument that comprises a processor and/or can be capable of effective and/or operative communication with a wired and/or wireless network. All suitable such embodiments are envisioned. For example, the multi-lingual natural language query system 100 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players and/or another type of device.

The multi-lingual natural language query system 100 can be coupled (e.g., communicatively, electrically, operatively, optically and/or the like) to one or more external systems, sources and/or devices (e.g., classical and/or quantum computing devices, communication devices and/or the like) via a data cable (e.g., High-Definition Multimedia Interface (HDMI), recommended standard (RS) 232, Ethernet cable and/or the like). In some embodiments, the multi-lingual natural language query system 100 can be coupled (e.g., communicatively, electrically, operatively, optically and/or the like) to one or more external systems, sources and/or devices (e.g., classical and/or quantum computing devices, communication devices and/or the like) via a network.

In some embodiments, a network 130 can comprise one or more wired and/or wireless networks, including, but not limited to, a cellular network, a wide area network (WAN) (e.g., the Internet), or a local area network (LAN). For example, the multi-lingual natural language query system 100, the annotation component 102, the interpretation component 104, and/or the translation component 106 can communicate with one or more external systems, sources and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, the multi-lingual natural language query system 100 can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and software that facilitates communicating information among the multi-lingual natural language query system 100 and external systems, sources and/or devices (e.g., computing devices, communication devices and/or the like).

The multi-lingual natural language query system 100 can comprise one or more computer and/or machine readable, writable and/or executable components and/or instructions that, when executed by processor 122 (e.g., a classical processor, a quantum processor and/or the like), can facilitate performance of one or more operations defined by such component(s) and/or instruction(s). Further, in numerous embodiments, any component associated with the multi-lingual natural language query system 100, as described herein with or without reference to the various figures of the one or more embodiments, can comprise one or more computer and/or machine readable, writable and/or executable components and/or instructions that, when executed by processor 122, can facilitate performance of one or more operations defined by such component(s) and/or instruction(s). For example, the annotation component 102, the interpretation component 104, the translation component 106, and/or any other components associated with the multi-lingual natural language query system 100 as disclosed herein (e.g., communicatively, electronically, operatively and/or optically coupled with and/or employed by system 100), can comprise such computer and/or machine readable, writable and/or executable component(s) and/or instruction(s). Consequently, according to numerous embodiments, the multi-lingual natural language query system 100 and/or any components associated therewith as disclosed herein, can employ processor 122 to execute such computer and/or machine readable, writable and/or executable component(s) and/or instruction(s) to facilitate performance of one or more operations described herein with reference to system 100 and/or any such components associated therewith.

The multi-lingual natural language query system 100 can facilitate (e.g., via processor 122) performance of operations executed by and/or associated with annotation component 102, the interpretation component 104, the translation component 106, and/or another component associated with system 100 as disclosed herein. For instance, as described in detail below, the multi-lingual natural language query system 100 can facilitate via processor 122 (e.g., a classical processor, a quantum processor and/or the like): generating one or more language invariant signals; generating a complete query intent using the one or more language invariant signals; and/or processing the complete query intent to an executable backend query to facilitate multi-lingual query interpretation. As will be apparent from the below, one or more systems can be employed to facilitate zero-shot transfer of the one or more language invariant signals (e.g., such as to be independent of domain/language specific training).

In embodiments, the multi-lingual natural language query system 100 can include one or more annotation components 102, one or more interpretation components 104, one or more translation components 106, one or more system buses 120, one or more processors 122, one or more memory/storage components 124, one or more networks 130, one or more input devices 132, and/or one or more computer applications 134. The annotation component 102, the interpretation component 104, and the translation component 106 can be connected with one or more machines comprised by the multi-lingual natural language query system 100. As used herein, the one or more machines can include one or more of a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone and/or another type of device.

Turning next to FIG. 10, the following discussion and associated figure are intended to provide a brief, general description of a suitable computing environment 1000 in which one or more embodiments described herein at FIGS. 1-9C can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code involved in performing the inventive methods, such as multi-lingual natural language query code block 1100. In addition to block 1100, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1100, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1100 in persistent storage 1013.

COMMUNICATION FABRIC 1011 is the signal conduction paths that allow the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface type operating systems that employ a kernel. The code included in block 1100 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The embodiments described herein can be directed to one or more of a system, a method, an apparatus or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++ or the like, or procedural programming languages, such as the "C" programming language or similar programming languages. The computer readable program instructions can execute entirely on the user's computer, partly on the user's computer, as a stand-alone software package, partly on the user's computer or partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In one or more embodiments, electronic circuitry including, for example, programmable logic circuitry, field-programmable gate arrays (FPGA) or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described herein with reference to flowchart illustrations or block diagrams of methods, apparatus (systems), and computer program products according to one or more embodiments described herein. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus or other device to cause a series of operational acts to be performed on the computer, other programmable apparatus or other device to produce a computer implemented process, such that the instructions which execute on the computer, other programmable apparatus or other device implement the functions/acts specified in the flowchart or block diagram block or blocks.

The flowcharts and block diagrams in the figures illustrate the architecture, functionality, and operation of possible implementations of systems, computer-implementable methods or computer program products according to one or more embodiments described herein. In this regard, each block in the flowchart or block diagrams can represent a module, segment or portion of instructions, which comprises one or more executable instructions for implementing the specified logical function(s). In one or more alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that the one or more embodiments herein also can be implemented in combination with other program modules. Generally, program modules include routines, programs, components, data structures or the like that perform particular tasks or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics or the like. The illustrated aspects can also be practiced in distributed computing environments in which tasks are performed by remote processing devices that are linked through a communications network. However, some, if not all aspects of the one or more embodiments can be practiced on stand-alone computers. In a distributed computing environment, program modules can be located in both local and remote memory storage devices.

As used in this application, the terms "component," "system," "platform," "interface," or the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) or Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing the one or more embodiments, but one of ordinary skill in the art can recognize that many further combinations and permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the one or more embodiments provided herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a memory that stores computer executable components; and
    a processor, operably coupled to the memory, and that executes the computer executable components stored in the memory, wherein the computer executable components comprise:
        an annotation component that generates one or more language invariant signals; and
        an interpretation component generates a complete query intent using the one or more language invariant signals; and
        a translation component that processes the complete query intent to an executable backend query to facilitate multi-lingual query interpretation.

2. The system of claim 1, wherein the translation component is operatively connected with the interpretation component to generate a zero-shot transfer of the one or more language invariant signals.

3. The system of claim 2, wherein the annotation component searches the one or more language invariant signals for one or more trigger words to confirm a predicted query intent.

4. The system of claim 3, wherein the annotation component utilizes part-of-speech (POS) tagging in predicting the query intent of the one or more language invariant signals.

5. The system of claim 4, wherein the annotation component employs a dependency parse tree in predicting the query intent of the one or more language invariant signals.

6. The system of claim 1, wherein the annotation component predicts a query intent of the one or more language invariant signals independent of domain specific training.

7. The system of claim 1, wherein the annotation component predicts a query intent of the one or more language invariant signals independent of language specific training.

8. A computer implemented method of multi-lingual query interpretation, comprising:
   generating, using a processor, one or more language invariant signals;
   generating, using the processor, a complete query intent using the one or more language invariant signals; and
   processing, using the processor, the complete query intent to an executable backend query to facilitate multi-lingual query interpretation.

9. The computer implemented method of claim 8, further comprising:
   searching, using the processor, the one or more language invariant signals for one or more trigger words to confirm a predicted query intent.

10. The computer implemented method of claim 9, further comprising:
    predicting, using the processor, a query intent of the one or more language invariant signals independent of domain specific training.

11. The computer implemented method of claim 9, further comprising:
    predicting, using the processor, a query intent of the one or more language invariant signals independent of language specific training.

12. The computer implemented method of claim 11, further comprising:
    employing, using the processor, a dependency parse tree in predicting the query intent of the one or more language invariant signals.

13. The computer implemented method of claim 9, further comprising:
    part-of-speech (POS) tagging, using the processor, in predicting the query intent of the one or more language invariant signals.

14. A computer program product for multi-lingual query interpretation, the computer program product comprising a non-transitory computer readable storage medium having program instructions embodied therewith, the program instructions executable by a processor to cause the processor to:
    generate, using the processor operatively coupled to memory, one or more language invariant signals;
    generate, using the processor, a complete query intent using the one or more language invariant signals; and
    process, using the processor, the complete query intent to an executable backend query to facilitate multi-lingual query interpretation.

15. The computer program product of claim 14, wherein the program instructions further cause the processor to:
    generate, using the processor, a zero-shot transfer of the one or more language invariant signals.

16. The computer program product of claim 15, wherein the program instructions further cause the processor to:
    search, using the processor, the one or more language invariant signals for one or more trigger words to confirm a predicted query intent.

17. The computer program product of claim 16, wherein the program instructions further cause the processor to:
    part-of-speech (POS) tag, using the processor, in predicting the query intent of the one or more language invariant signals.

18. The computer program product of claim 15, wherein the processor predicts the query intent of the one or more language invariant signals independent of language specific training.

19. The computer program product of claim 18, wherein the program instructions further cause the processor to:
    employ, using the processor, a dependency parse tree in predicting the query intent of the one or more language invariant signals.

20. The computer program product of claim 15, wherein the processor predicts the query intent of the one or more language invariant signals independent of domain specific training.

* * * * *